United States Patent [19]

Gougoulas

[11] 4,178,648

[45] Dec. 18, 1979

[54] DRYER CURTAIN FOR CAR WASH

[76] Inventor: Harry K. Gougoulas, 1875 Philomene, Lincoln Park, Mich. 48146

[21] Appl. No.: 960,374

[22] Filed: Nov. 13, 1978

Related U.S. Application Data

[63] Continuation-in-part of Ser. No. 929,079, Jul. 28, 1978, abandoned.

[51] Int. Cl.² .............................................. B60S 3/04
[52] U.S. Cl. .............................. 15/97 B; 15/DIG. 2
[58] Field of Search ............... 15/DIG. 2, 97 R, 97 B, 15/302

[56] References Cited

U.S. PATENT DOCUMENTS

| | | | |
|---|---|---|---|
| 1,118,547 | 11/1914 | Griffin | 15/97 R |
| 1,908,788 | 5/1933 | Pullian | 15/97 B |
| 1,928,993 | 10/1933 | Cutler | 15/97 R |
| 3,504,394 | 4/1970 | Weigele et al. | 15/97 B X |
| 4,087,877 | 5/1978 | Barber | 15/97 B |

*Primary Examiner*—Edward L. Roberts
*Attorney, Agent, or Firm*—Krass & Young

[57] ABSTRACT

A continuous loop dryer curtain for automatic car washes. In one embodiment the curtain comprises a closed loop of water absorbent material such as towel or chamois supported from an overhead roller extending transversely of the wash lane and passing through spring biased wringer rollers to dry the towel between vehicles. In another embodiment, the continuous loop is a non-absorbent material such as sheet vinyl and carries two or more depending towels at spaced points thereon. An intermittent drive causes the loop to be advanced a distance along its own length for each vehicle. Water which is wrung from the drying material is carried off by means of a drain pan and hose. A rinse source is provided.

13 Claims, 4 Drawing Figures

DRYER CURTAIN FOR CAR WASH

REFERENCE TO RELATED APPLICATIONS

This application is a continuation-in-part of application Ser. No. 929,079, filed July 28, 1978, now abandoned.

INTRODUCTION

This invention relates to car washing apparatus and particularly to a depending curtain-type dryer having a continous loop configuration.

BACKGROUND OF THE INVENTION

Most automatic car washes rely at least partly upon a dryer mechanism toward the end of the wash lane to remove excess water from vehicles after they are washed. In recent years, high velocity air blowers have been used for this purpose. However, such devices consume substantial power during operation and energy conservation demands have resulted in a search for alternative drying methods and apparatus.

The great majority of the alternative dryer devices appearing in the patent literature comprise strips of water absorbent material depending from some sort of overhead carriage. Fromme U.S. Pat. No. 3,914,818 discloses a carousel-type device which is supported above a car wash lane to rotate a plurality of depending strips about a vertical axis. Each of the strips is caused to pass through a pair of vertically oriented wringer rollers at the side of the structure as the carousel rotates. Moran U.S. Pat. No. 3,940,821 discloses a dryer having a large overhead drum from which a series of dryer strips depend. A gas-fired heater is positioned adjacent the upper portion of the drum for warming and drying the strips as the drum rotates. Weigele et al, U.S. Pat. No. 3,504,394 discloses an overhead chain drive system which extends longitudinally along the wash lane to support a series of depending dryer strips which the vehicle encounters in succession as it moves through the wash lane. Drying of the strips is accomplished by means of a suction pipe.

None of the prior art systems represents an automatic car drying apparatus which is energy conserving, yet effective and economical to construct and install.

BRIEF DESCRIPTION OF THE INVENTION

The principal object of the present invention is to provide a simple, effective, economical and energy conserving drying device which is susceptible of automatic operation in a conventional car wash system. In general, this is accomplished by providing a curtain-type dryer including an endless loop of material which is water absorbent itself or which carries elements of water absorbent material, a support structure for supporting the loop over a car wash lane such that the free end depends vertically into the car wash lane and a simple mechanical device independent of the support means for mechanically wringing water from the drying curtain.

In one embodiment, the loop itself is water absorbent and depends to such an extent as to engage vehicles passing through the wash lane. In another embodiment, the loop is merely a carrier for circumferentially spaced depending sheets which engage the vehicles.

In either of the embodiments of the invention, means are provided for causing discontinuous or intermittent operation of a drive device thereby to feed the loop of material through the wringer in advance of engagement with a car in the wash lane. Accordingly, no energy is consumed when vehicles are not passing through the wash lane and, in addition, the dryer curtain is stationary as the vehicle passes through its area of effect.

In accordance with a still further preferred feature of the invention, means are provided for catching and draining away the water which is wrung from the loop of absorbent material so that it does not fall downwardly into the bight portion of the loop or onto vehicles or persons which might be in the area.

In the embodiment which utilizes a loop of water-absorbent material, an insert of higher density but flexible material such as rubber is dependingly disposed with the loop to cause it to remain in strong contact with a vehicle during the passage of the vehicle through the drying area. A tapered, i.e. downwardly flaring, sheet of flexible material such as rubber has been found to be particularly effective for this purpose. Other details of the invention will be disclosed with reference to the drawing.

DETAILED DESCRIPTION OF THE SPECIFIC EMBODIMENT

Figure 2:
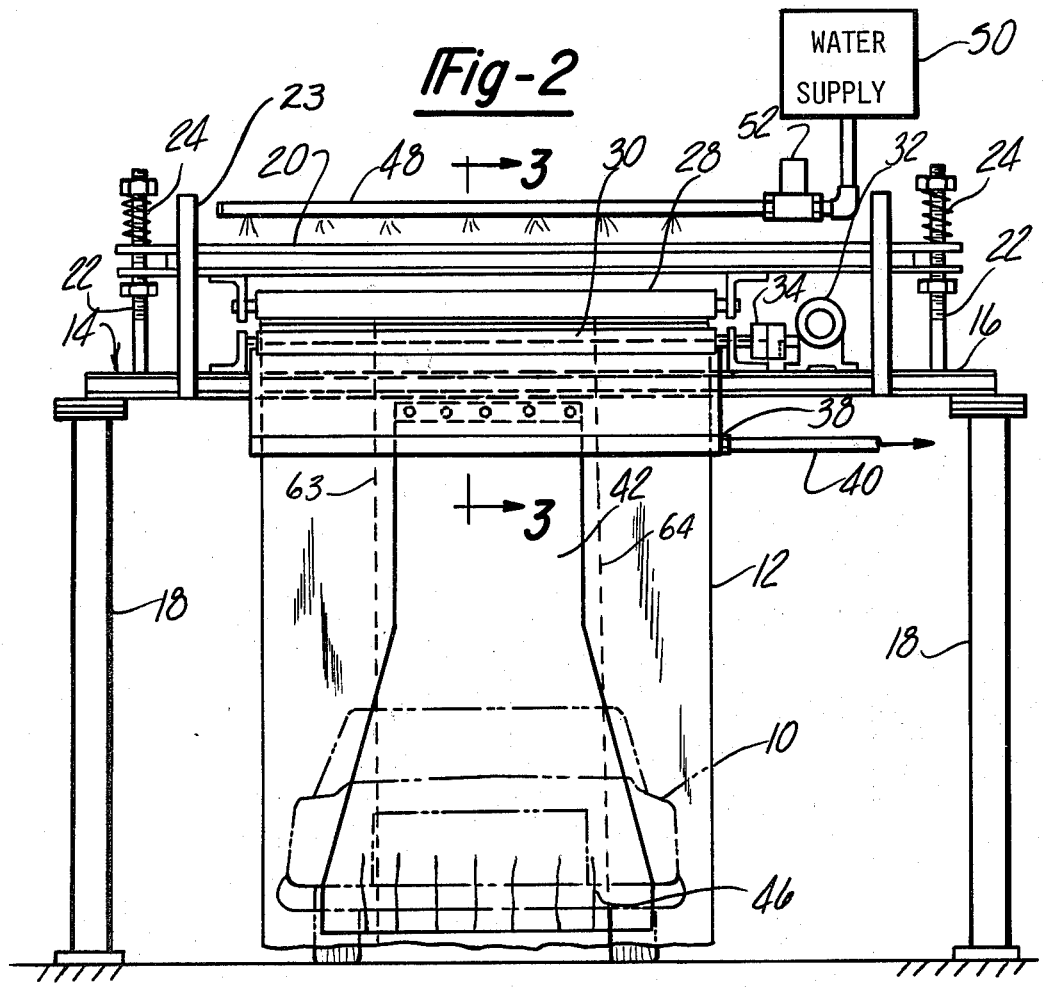
FIG. 2 is a front view of a first illustrative embodiment of the dryer apparatus.
Figure 3:
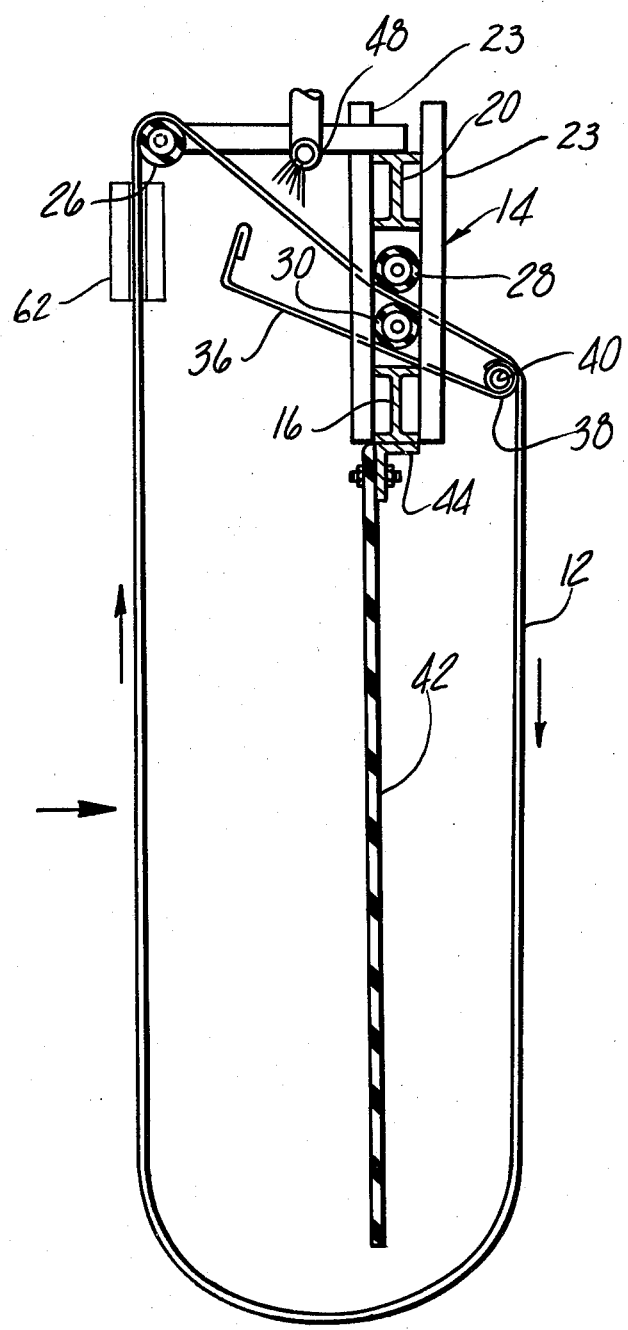
FIG. 3 is a side view of the first embodiment of the dryer apparatus with portions in section to show the details of the wringer, support, insert and drain mechanism.

Referring to FIGS. 2 and 3, an automobile 10 as shown disposed in a washing lane of a conventional automatic or semi-automatic car wash where it is about to encounter a depending continuous loop dryer curtain 12 of water absorbent material such as a towel or chamois. The loop 12 of water absorbent material is supported above and transversely of the wash lane by support means 14 so as to depend into the wash lane where it hangs just above the ground level as illustrated in FIGS. 2 and 3. The width of the loop 12 is greater than the width of the conventional automobile 10 as shown in FIG. 2.

The support apparatus 14 is shown to comprise a lower beam 16 extending transversely across the wash lane and supported on standards 18 which are sufficiently widely spaced to accommodate the vehicle 10 as well as any additional apparatus or personnel passageway as may be desired. Suport means 14 further includes an upper beam 20 extending transversely of the wash lane and mounted on threaded rods 22 between spaced guides 23 which are welded to lower beam 16 to control vertical movement of beam 20. The support means further comprises an idler roller 26 which is disposed at the highest point inside of the loop 12 and which extends transversely of the wash lane to permit free travel of the loop along its own length as hereinafter described in greater detail.

Adjacent but otherwise independent of the support roller 26 is a pair of parallel juxtaposed wringer rollers 28 and 30, roller 28 being carried by the vertically movable upper beam 20 and lower roller 30 being fixed immovably to the lower beam 16. The loop 12 of water absorbent material passes between the transversely extending rollers as best shown in FIG. 3 for the purpose of wringing water from the loop in preparation for the drying of an oncoming vehicle 10. Springs 24 on rods 22 bias beam 20 and roller 28 downwardly to enhance the squeezing or wringing process. Water which is wrung from the loop by rollers 28 and 30 falls vertically into a transversely extending pan 36 having a smoothly looped-back lower end 38 which serves two purposes; first, the curved end 38 receives a drain hose 40 which allows the water caught by pan 36 to be drained away from the drying area; and secondly, the end 38 provides a smooth bearing zone for the loop 12 of water absorbent material as it is caused to move along its length by rotation of the wringer rollers 28 and 30. The elevated position of roller 26 relative to wringer rollers 28 and 30 ensures that no water passes from the wringer area downwardly along the portion of loop 12 which will encounter the next vehicle.

The loop 12 is advanced along its length between vehicles to move a dry portion of the loop into a position where it will engage the advancing vehicle (note arrow).

Intermittent travel of the loop 12 along its length is produced by an electric motor 32 mounted on the support means 14 and interconnected with the lower roller 30 by means of a gear reduction drive 34.

To give the loop 12 maximum drying ability, a sheet 42 of higher density but flexible material such as rubber is dependingly hung from a bracket 44 attached to the lower beam 16 as shown in FIG. 3. The sheet 42 of rubber constitutes an insert for the loop, is wholly contained within the enclosed volume of the loop 12 and is flared toward the bottom as best shown in FIG. 2. The bottom edge of the insert sheet is split as indicated by lines 46 in FIG. 2 for additional pliability and to more readily allow the dryer loop 12 to conform to the contour of the vehicle 10 and to envelop such external obstacles as mirrors and ornaments.

Rinsing of the loop 12 is accomplished by means of a water pipe 48 with spray outlets disposed just above the loop 12 mediate the roller 26 and the roller 28 as shown in FIG. 3. Pipe 48 is connected to a water supply 50 through an automatically controlled solenoid valve 52 which permits the water to be turned on and off along with the motor 32 such that rinsing only occurs as the loop 12 is being rotated along its length in anticipation of the arrival of vehicle 10.

Figure 1:
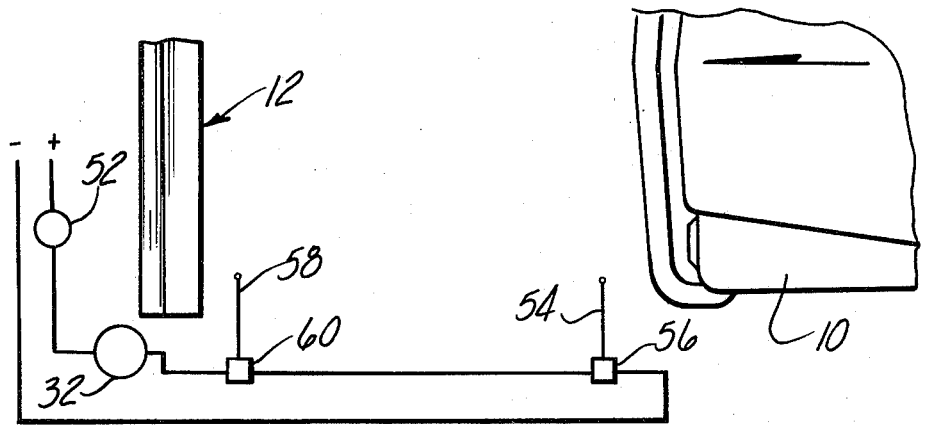
FIG. 1 is an overhead or plan view of a portion of a wash lane illustrating a control circuit for the dryer advance mechanism hereinafter described.

A simple but effective control circuit is shown in FIG. 1 to comprise a first vehicle engaging wand 54 connected to operate a normally open switch 56 and a second vehicle engaging wand 58 connected to operate the normally closed switch 60. Both switches 56 and 58 are connected in series with the starter of motor 32, valve 52 and then to a line voltage source as indicated. Wand 54 is disposed approximately five feet in advance of the dryer loop 12 and wand 58 is disposed approximately one foot in advance of the dryer loop 12.

In operation the vehicle 10 engages wands 54 causing switching 56 to close and applying line voltage to the motor 32 and valve 52. Operation of the motor 32 causes lower wringer roller 30 to rotate thus causing the loop 12 to advance along its own length while rinse water is supplied through pipe 48. The rinse water along with water picked up by the loop 12 from a prior drying operation is wrung therefrom and into the pan 36 where it is carried off by tube 40. The vehicle continues for approximately four feet until it encounters wand 58. Moving the wand 58 causes normally closed switch 60 to open whereby both motor 32 and valve 52 are de-energized. The rinse water stops and the loop 12 remains stationary as it passes over the vehicle 10 for the drying operation. Both switches 56 and 60 return to the normal condition as the vehicle drives away. Depending on the overall length of the loop 12 approximately three to five feet of linear travel between the vehicles may be desired.

The rollers 26, 28 and 30 are typically made by disposing cylindrical lengths of rubber or other pliable material onto metal tubes of approximately one to three-inch outside diameter. Conventional pillow blocks and other bearing devices may be employed to support the rollers relative to the support means 14 as will be apparent to the skilled mechanic. A rope is preferably sewn into hemmed lateral edges of loop 12 for better wear and to co-operate with slotted tubular guide means 62 adjacent each lateral edge and secured to the support means 14 to prevent lateral shifting of the curtain.

It is to be understood that various modifications to the apparatus of FIGS. 1–3 may be made. For example, it is possible to accommodate vehicles with mast-type radio antennae by splitting the curtain 12 into three parallel loops along the broken lines 63, 64 in FIG. 2. In this case, the edges of each section are provided with slotted tubular guides to prevent lateral shifting of the curtain sections.

Figure 4:
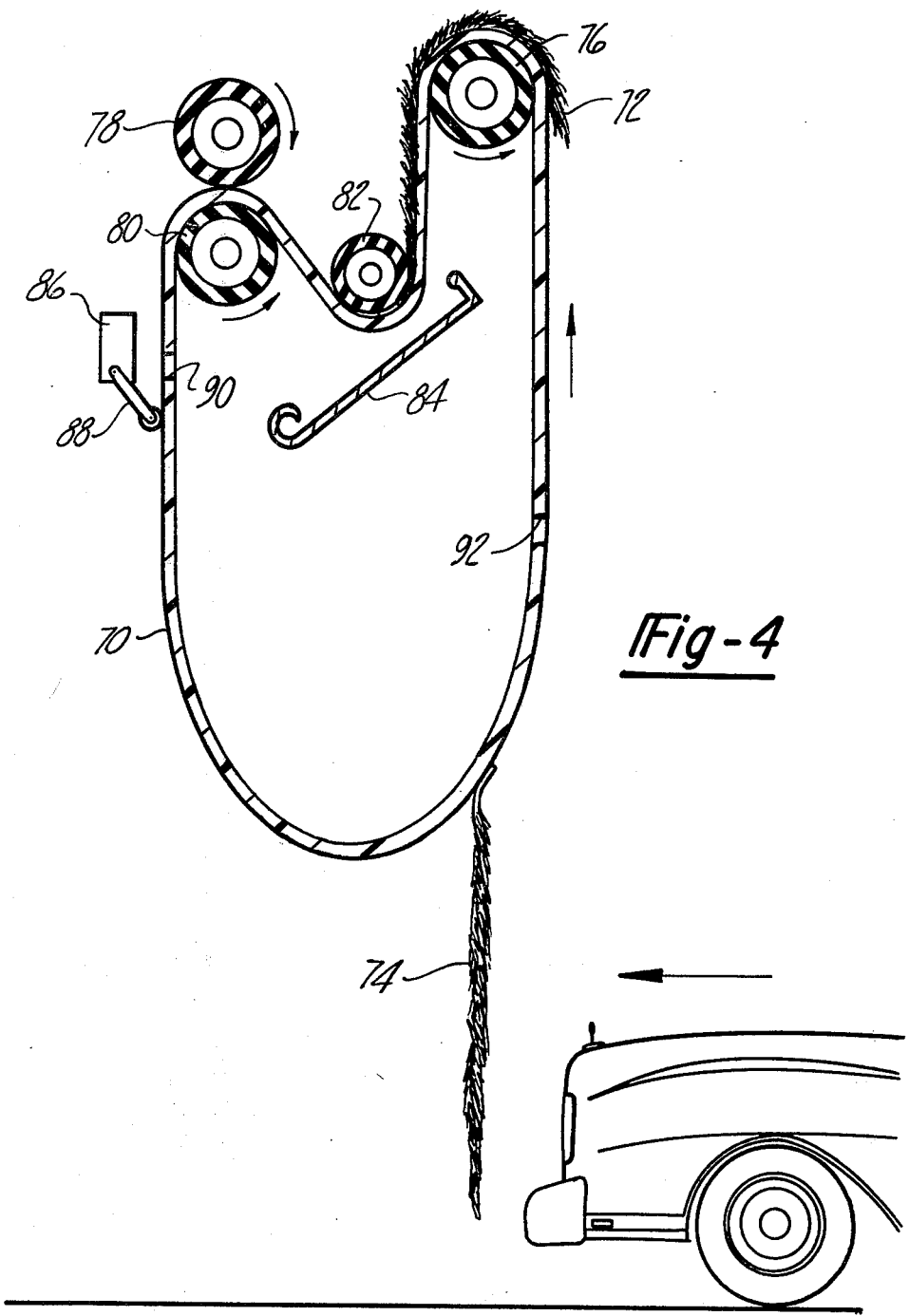
FIG. 4 is a side view of a second embodiment of the invention wherein the loop carries spaced depending sheets of towel or chamois.

FIG. 4 illustrates a second embodiment of the invention in which loop 70 is fabricated of sheet vinyl or other non-absorbent material to serve as a carrier for towel or chamois sheets 72 and 74. Carrier loop 70 is preferably about six to eight feet wide. Sheets 72 and 74 are also about six to eight feet wide and may be solid, or alternatively, split into three sections in about the proportions of loop 12 as seen in FIG. 2.

Loop 70 passes over and is supported over the wash lane by idler roller 76 which is a full width, rubber cushioned cylinder similar to roller 26 of FIG. 3. Loop 70 also passes between wringer rollers 78 and 80 to squeeze water from the towel sheets 72 and 74 between vehicles.

Intermediate idler roller 76 and wringers 78 and 80, a second idler roller 82 is disposed with the center of rotation about two inches below that of roller 80 so as to cause the loop to pass through a point substantially below the wringer area. Catch pan 84 is located immediately below the wringer area and below idler roller 82 to catch the water and drain it away.

Towel sheets 72 and 74 are spaced circumferentially along loop 70 at precisely calculated locations correlated with the operation of an intermittent drive system. In general, the system operates to place a freshly wrung-dry towel in front of each vehicle which passes through the wash line. Moreover, the towel is stationary as it engages the vehicle.

This is accomplished by means of an electrical circuit similar to that of FIG. 1, except that wand 58 is replaced by a limit switch 86 having an actuator arm 88 which engages the vinyl loop 70. Slots or apertures 90 and 92 in the vinyl loop 70 are spaced relative to the connection points of towels 72 and 74 to stop rotation of the loop when the towels are in the correct depending position; for example, slot 90 meets arm 88 of switch 86 when towel 74 reaches approximately the position shown in FIG. 4. A wand such as 54 in FIG. 1 is used to start the loop rotation as previously described with reference to FIGS. 1 and 2.

Exemplary dimensions of an operating system are as follows:

Thickness of vinyl loop: ⅛ inch
Width of vinyl loop: 84 inches
Width of towel strip: 84 inches
Length of towel strip: 48 inches
Height of loop above floor: 60 inches
Height of towel end above floor: 12 inches
Location points of towels: circum.÷2

Again, it may be necessary or desirable to incorporate guides for the loop 70 to ensure proper alignment on rollers 76, 82, 78 and 80. Such arrangements will be apparent to the skilled artisan.

The embodiment of the invention in which an exclusive property or privilege is claimed is defined as follows:

1. A curtain-type dryer for use in a car wash comprising:

an endless loop of material, said loop having at least portions associated therewith for the absorbtion of water from vehicles:

first roller means supporting said loop so as to define a free end which depends vertically into a car wash lane;

and second roller means independent of said first roller means for writing water from said portions, the combination further including drive means for causing intermittent incremental travel of said loop relative to the first and second roller means, said drive means including sensor means disposed in said wash lane to cause incremental travel of said loop for a circumferential distance less than the total developed length thereof immediately prior to engagement with a car in said lane whereby a freshly wrung area is caused to engage each of said cars in said wash lane in succession.

2. Apparatus as defined in claim 1 further including drain means for collecting water wrung from said loop by said second roller means and for directing collected water away from the area of said lane beneath said loop.

3. Apparatus as defined in claim 1 wherein said first roller means comprises a single roller supportingly disposed within said loop.

4. Apparatus as defined in claim 3 wherein said second roller means comprises a pair of parallel, juxtaposed wringer rollers with said loop passing therebetween.

5. Apparatus as defined in claim 4 wherein said second roller means further includes bias means for urging said wringer rollers toward one another.

6. Apparatus as defined in claim 1 further including third means for causing said loop of material to travel about said first means, and fourth means intermediate said first and second means for rinsing the loop of material as it travels.

7. Apparatus as defined in claim 1 further including drain means extending transversely of the car wash lane beneath said second roller means for collecting water wrung from said loop of material by said second roller means and for directing collected water away from the area of said lane.

8. Apparatus as defined in claim 1 further including an insert of relatively higher density material disposed within said loop dependingly set from said first means with the free end thereof substantially in the area of the free end of said loop.

9. Apparatus as defined in claim 8 wherein the insert is fabricated of a flexible material such as rubber and is of a configuration which increases in width from top to bottom but at all vertical locations is of lesser width than said loop of material.

10. Apparatus as defined in claim 1 wherein the loop is constructed of non-absorbent material and carries a plurality of depending water-absorbent sheets of circumferentially spaced points thereon.

11. Apparatus as defined in claim 1 wherein the overall width of said loop of material is substantially greater than the width of a car passing through said lane.

12. Apparatus as defined in claim 11 wherein the loop of material is split into plural loop sections.

13. Apparatus as defined in claim 1 wherein the sensor means includes a limit switch contacting the loop, and a plurality of circumferentially spaced apertures in the loop operatively associated with the limit switch to stop circumferential travel of the loop at spaced points therealong.

* * * * *